United States Patent [19]

Priore

[11] 4,199,910
[45] Apr. 29, 1980

[54] T-SHAPED EDGE FINISHING STRIPS AND THEIR PRODUCTION

[76] Inventor: Alfred J. Priore, 73 Taylor St., Dedham, Mass. 02026

[21] Appl. No.: 936,013

[22] Filed: Aug. 23, 1978

[51] Int. Cl.² ............................................. E04F 19/02
[52] U.S. Cl. .................................................... 52/716
[58] Field of Search ............................ 52/716; 49/479

[56] References Cited

U.S. PATENT DOCUMENTS

| | | | |
|---|---|---|---|
| 1,931,315 | 10/1933 | Brook | 49/479 |
| 2,705,820 | 4/1955 | Torrence | 52/716 |
| 2,817,881 | 12/1957 | Camp | 52/716 |
| 2,825,999 | 3/1958 | Dompieri | 52/716 |

FOREIGN PATENT DOCUMENTS

| | | | |
|---|---|---|---|
| 202814 | 5/1939 | Switzerland | 52/716 |
| 345724 | 5/1960 | Switzerland | 52/716 |

*Primary Examiner*—James L. Ridgill, Jr.

[57] ABSTRACT

An extruded T-shaped edge finishing strip has its tongue divided by a series of narrow abutting fingers of oblong section arranged in parallel and diagonally with their centers spaced along the original line of junction between the tongue and the face of the strip. Corresponding ends of the fingers are offset relative to the other ends of the appropriate adjacent fingers to enable the fingers to slide relative to each other or to spread apart as the face is bent as required by the curvature of the edge to be finished by the strip.

Apparatus for thus modifying the tongues of such strips has a flat support having a channel extending lengthwise thereof and dimensioned to receive the tongue of the strip with the undersurface of the face resting on the support. The channel passes between two gears having their upper faces substantially flush with the support, one gear a driving gear and the other one an idler, and the gears are spaced so that the tongue is such a force fit therein that the fingers are formed by the distortion of the tongues by the coaction of the gears.

4 Claims, 7 Drawing Figures

T-SHAPED EDGE FINISHING STRIPS AND THEIR PRODUCTION

This application is a substitute for Ser. No. 367,742, filed June 7, 1973, now abandoned.

BACKGROUND OF THE INVENTION

In woodwork of many different types, it is necessary to use strips to finish exposed edges. While the problem may exist with lumber of the best quality, it is particularly troublesome in making such products as valances, cabinets, cabinet doors and the like where curved edges, S-curves for example, are routinely required and where plywood and composition boards are commonly used.

Extruded plastic finishing strips are provided for attachment to the exposed edges of such structures. The strips are T-shaped in cross section with a tongue extending lengthwise and centrally of the face. Extruded strips of ethyl cellulose have proved satisfactory. In practice, each exposed edge of the woodwork is provided with a central slot, typically one-sixteenth of an inch in width and of a depth to receive the tongue with the under portions of the face engaging at least the margins of the edge. In practice, glue is used to securely anchor the tongues in the slots and the tongues of such strips are formed with ribs extending lengthwise of each of their sides providing barbs to facilitate effective anchorage.

Such strips provide a satisfactory basis for edge-finishing and are easily produced in a wide range of shapes and colors. They do, however, present certain problems arising from the fact that the tongues make it impossible to bend the faces for curves of either an inside or outside radius. If lengths of such strips are provided in coils of a relatively large size, the faces twist enough to cause noticeable irregularities which must be removed before the strip is used. As a consequence, the strips are often supplied in straight lengths, sixteen feet, for example, and packaged in tubes although such relatively short lengths lead to a relatively large amount of waste as compared to coils containing, say, fifty feet strips to enable a finishing strip to be applied to curved edges, it is necessary for its tongue to the cut at spaced intervals at right angles to the face to enable the face to be bent in the required direction. This is usually done in the shop by repeatedly advancing the tongue against a band saw. Aside from the risk of injury to the operator, there is the difficulty of making such cuts of adequate depth without cutting into the face.

THE PRESENT INVENTION

The general objective of the present invention is to provide T-shaped, edge-finishing strips that have tongues eliminating the problems arising from their present construction, an objective attained by dividing the tongue into a series of narrow, abutting fingers of a generally oblong section and extending close to and at right angles to the face of the strip with the fingers parallel and diagonally disposed with their centers located along the original line of junction between the tongue and the face of the strip. The corresponding ends of the fingers are offset relative to the other ends of the appropriate adjacent sections so that when a curved edge to which the strip is to be attached is defined by an inside radius, the fingers slide into the overlapping relationship required by the radius and become spaced apart when the curved edge is defined by an outside radius.

Yet another objective of the invention is to provide a tongue in which the fingers do not increase the tongue thickness to an objectionable extent, an objective attained by having the fingers disposed to overlap slightly when the strip is straight with the outside corner of corresponding finger ends in contact with the inside corner of the appropriate ones of the other finger ends.

Another objective of the invention is to produce such strips by distorting the tongue in opposite directions and in closely spaced zones simultaneously to form the fingers and to position them with their abutting relationship in the form of short, uniform overlaps.

Another general objective of the invention is to provide apparatus for forming the tongue with the fingers, an objective attained with apparatus having a flat support provided with a tongue receiving channel extending from end-to-end thereof and with transversely aligned recesses, one on each side of the channel and opening into it. A gear is rotatably mounted in each recess with its upper face substantially flush with the surface of the support and the gears are spaced apart to accommodate the tongue as a force fit between them and means are provided to drive one gear so that once the tongue is caught, it is advanced along the slot with the gear teeth coacting to form the fingers by distorting and stretching the tongue material.

Another objective of the invention is to provide for the safe and positive operation of the apparatus, an objective attained by utilizing a hold-down detachably attached to the support and both covering the gears and holding the face of the strip against the support.

BRIEF DESCRIPTION OF THE DRAWINGS

In the accompanying drawings, a preferred embodiment of the invention is shown

THE PREFERRED EMBODIMENT OF THE INVENTION

An edge-finishing strip in accordance with the invention consists of a tongue, generally indicated at 10 extending from end-to-end and centrally of the strip face 11. The strip is or may be any of the presently available extrusions with its tongue 10 having ribs 12 extending lengthwise of each side and defining barbs to facilitate the anchoring of the tongue 10 in a slot in an exposed edge of the woodwork.

Figure 6:
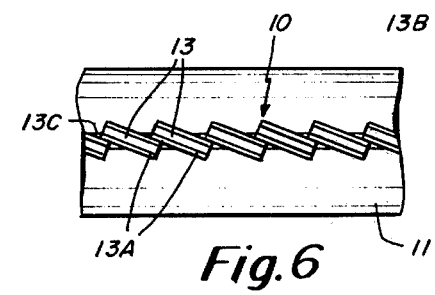
FIG. 6 is a view of the strip as seen from the edge of its tongue.
Figure 4:
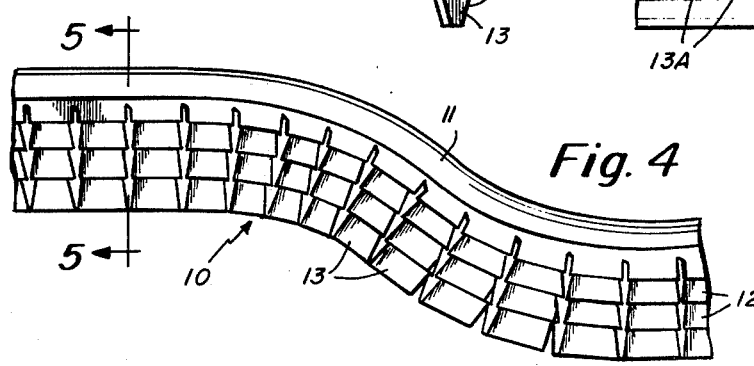
FIG. 4 is a side elevation, taken on an increase in scale of a length of the T-shaped finishing strip disposed with bends required by both inside and outside radii.
Figure 7:
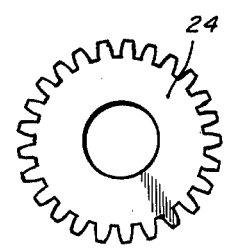
FIG. 7 is a plan view of one of the gears.

In accordance with the invention, the tongue 10, as the strip emerges from the extruder, before lengths thereof are shipped, or at least before a strip is used, is divided into a plurality of narrow abutting fingers 13 of a generally oblong cross section and extending at right angles to the face 11. The fingers 13 are, as may best be seen in FIG. 6, parallel and disposed diagonally with their centers located along the original line of junction between the tongue 10 and the face 11 and the ends 13A of the fingers 13 are offset relative to the ends 13B of the appropriate adjacent finger 13 to provide a short overlap so that when a curved edge to which the strip is to be attached is defined by an inside radius, the fingers 13 slide into overlapping relationships appropriate for the radius.

The abutting fingers 13 may be separate or interconnected wholly or in part by a web 13C but, in either case, when the face 11 is bent as required by a curved edge having an outside radius, the fingers 13 spreat apart as required by the curve.

In practice, it is preferred that the length of the sides of the fingers 13 be about one-sixth of an inch and they overlap slightly with the finger end 13A resting on the end 13B of the appropriate adjacent finger so that the overlap is minimum.

Tongues in accordance with the invention are, of course, thickened by the above defined finger arrangement but because of their disposition, the increase does not exceed one hundred percent and, if the tongue 10 is modified in the preferred manner, the increase in thickness is held to about fifty percent requiring a slight increase in the width of the tongue-receiving slots from one-sixteenth the tongue thickness commonly used at the present time to, say, three-thirty seconds of an inch.

As the plastics from which such strips are extruded are bendable and capable of being slightly stretched, the abutting fingers 13 and their desired relationship and positioning may be effected by distorting the tongue 10 in opposite transverse directions at closely spaced zones extending at right angles to the face 11 and substantially to the junction of the tongue 10 and the face 11.

Figure 1:
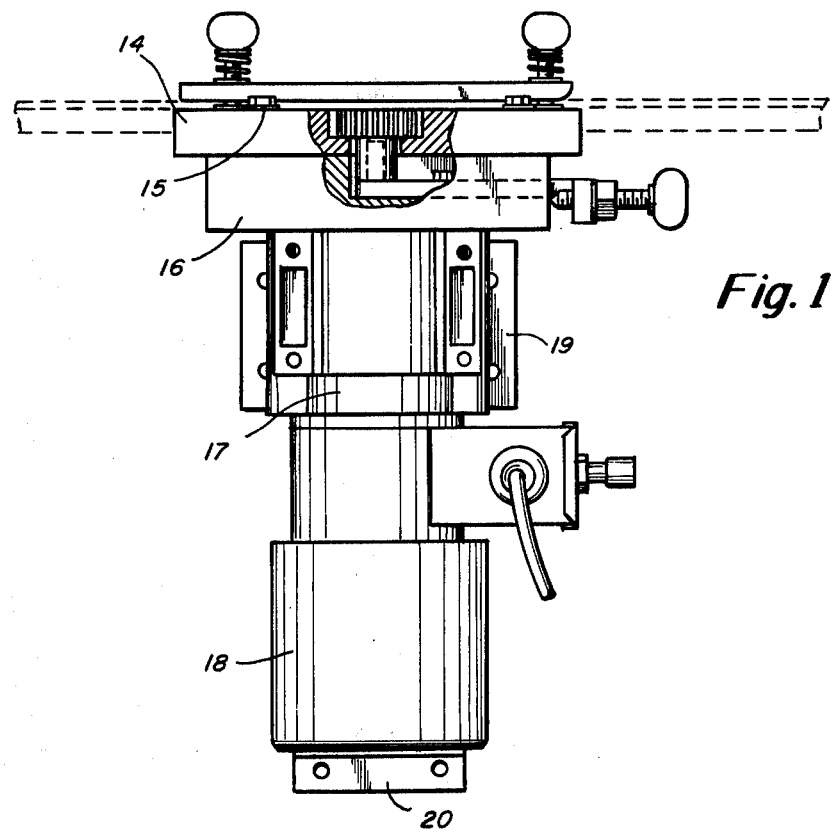
FIG. 1 is a partly sectioned side elevation of the apparatus.
Figure 2:
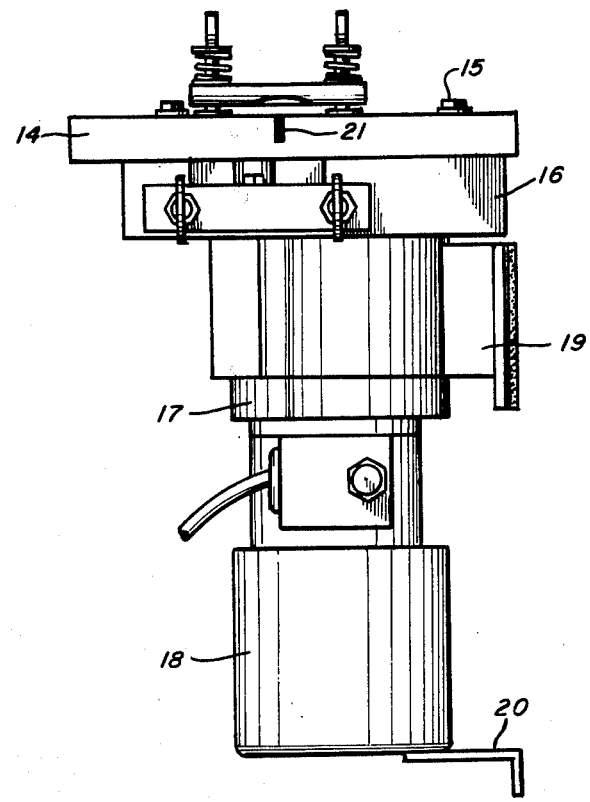
FIG. 2 is an elevation of the apparatus turned 90° from its FIG. 1 position.
Figure 3:
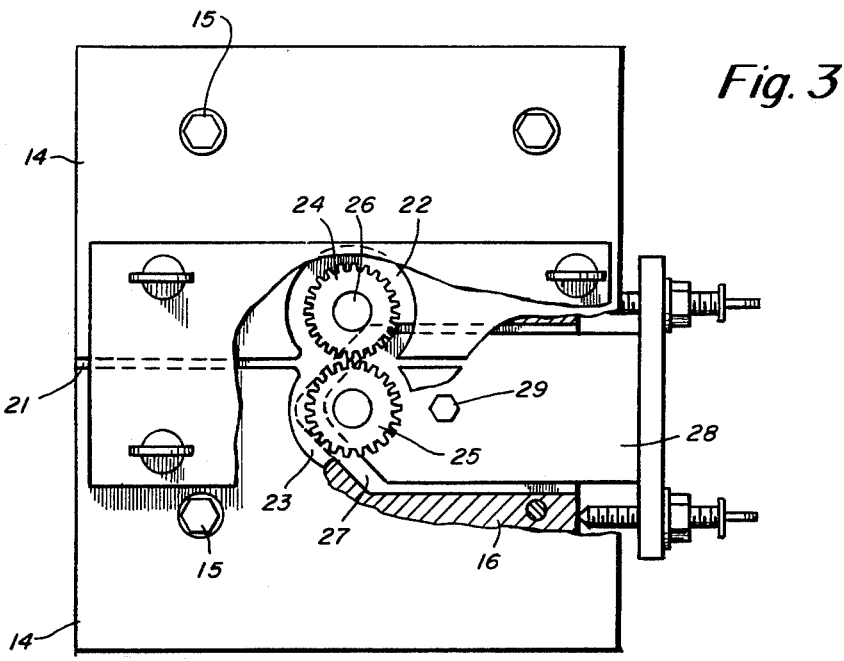
FIG. 3 is a partly sectioned plan view of the apparatus, taken on an increase in scale.
Figure 5:
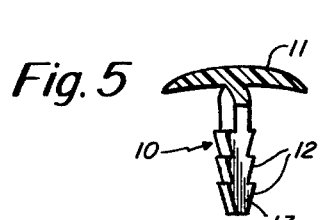
FIG. 5 is a section taken approximately along the indicated line 5—5 of FIG. 4.

In FIGS. 1-3 apparatus is shown for use in making finishing strips in accordance with the invention, the apparatus comprises a flat supporting plate 14 secured by bolts 15 to a mount 16 on the upper end of the gear box 17 to which the drive shaft (not shown) of an electric motor 18 is connected. The gear box 17 and the motor 18 have brackets 19 and 20, respectively, to enable them to be attached as a unit to a vertical wall or panel, the side of a bench for example.

The plate 14 has a channel 21, see FIG. 3, extending from end-to-end thereof and of a width and depth to freely receive the unaltered tongue 10 of a finishing strip with the undersurface of its face 11 resting on the plate 14. The plate 14 has recesses 22 and 23 on opposite sides of and opening into the channel 21 for gears 24 and 25 both identical and desirably those identified as YA 25-20° pressure angle, made by Boston Gear Works or gears substantially identical therewith.

The gear 24 is locked to the vertical output shaft 26 of the gear box 17 with the upper end of the shaft 26 flush with the upper face of the gear 24 and with said face flush with the upper surface of the plate 14.

The gear 25 is an idler and has a depending hub 27. The mount 16 has an upwardly opening recess 28 to the bottom of which a flat arm 29 is connected by a pivot 30. The arm 29 has a vertical stub shaft 31 threaded therein and entrant of a socket in the lower end of the hub 27 to support the gear 25 with its upper surface flush with the upper surface of the plate 14.

It will be appreciated that the position of the gear 25 relative to the gear 24 can be varied by swinging the arm 29 in one direction or the other. For that reason, the outer end of the arm 29 has a flange 32 through which are threaded thumb screws 33 which engage the proximate end of the mount 16 on opposite sides of the recess 28 thereby to enable the arm 29 to be swung to space the gear 25 closer to or further from the gear 24 and to lock the arm in the selected position by advancing one thumb screw 33 and retracting the other. In practice, once the gears 24 and 25 are spaced in the desired relationship for a particular tongue 10, typically with their centers spaced apart, no further adjustments would be normally needed.

It will be noted that the gears 24 and 25 are not fully engages with their spacing being such that the tongue 10 of a strip may be received therebetween as a force fit. In practice, a holder 34 is secured to the plate 14 as by thumb screws 33 which extend freely through the holder 34 and are threaded in the plate 15. The holder is spaced above the plate 14 by washers 36 and compression springs 37 are held captive by the screws 38 to resiliently oppose the lifting of the holder 34, the undersurface of which has a channel 39 overlying the channel 21 and shaped to receive the face 11 so that the holder 34 not only prevents the escape of the strip but also to provide a shield for the gears 24 and 25, ensuring safe operation of the apparatus.

In operation, and with the motor in service, the gear 34 drives the gear 25 and when an end of a strip is introduced into the apparatus with its tongue 10 in the channel 21, the tongue becomes caught between the gears by their teeth with the resulting distortion and stretching of the tongue forming the fingers 13 with the tongue material stretched as the fingers 13 are formed and biased into their desired abutting position which has been previously described.

The thus formed strips have the advantages that they can be bent or curved to meet even the smallest radius requirement and in addition, they can be formed in coils containing as many feet as may be wanted without risk of developing a twist in the faces 11.

I claim:

1. A flexible T-shaped finishing strip comprising an anchoring tongue and a head, said tongue extending from end-to-end of said head and insertable in a slot extending lengthwise of the edge of the woodwork and said head shaped and dimensioned to establish a finishing face for said edge when the tongue is thus anchored, said tongue including a series of relatively long and narrow fingers extending from its free edge substantially to the junction of said tongue with said head, all of said fingers parallel and disposed diagonally of said junction with their centers spaced therealong and with their ends uniformly offset and with the opposite sides of said ends overlapping and in mutual contact thus providing for sliding engagement of said fingers as said strip is curved to conform to an inside radius and presenting a substantially continuous surface when the strip is straight, said fingers being spread apart as required when the strip is bent to conform to an outside radius, and the lay of said fingers such that the maximum thickness of the tongue is about twice that of the fingers.

2. The flexible T-shaped finishing strip of claim 1 in which the lay of the fingers is such that the tongue is about one and one-half times as thick as the fingers.

3. The finishing strip of claim 1 in which the abutting ends of the fingers are at least partly joined by a web.

4. The finishing strip of claim 1 in which the width of each finger is in the neighborhood of one-sixth of an inch.

* * * * *